United States Patent
Agarwal et al.

(10) Patent No.: US 12,305,992 B2
(45) Date of Patent: May 20, 2025

(54) VEHICLE PERCEPTION-DATA GATHERING SYSTEM AND METHOD

(71) Applicant: Aptiv Technologies AG, Schaffhausen (CH)

(72) Inventors: Divya Agarwal, Sunnyvale, CA (US); Michael H. Laur, Mission Viejo, CA (US); Brian R. Hilnbrand, Mountain View, CA (US)

(73) Assignee: Aptiv Technologies AG, Schaffhausen (CH)

( * ) Notice: Subject to any disclaimer, the term of this patent is extended or adjusted under 35 U.S.C. 154(b) by 1127 days.

(21) Appl. No.: 17/087,582

(22) Filed: Nov. 2, 2020

(65) Prior Publication Data

US 2021/0072032 A1 Mar. 11, 2021

Related U.S. Application Data

(63) Continuation of application No. 15/897,566, filed on Feb. 15, 2018, now Pat. No. 10,866,103.

(Continued)

(51) Int. Cl.
*G01C 21/34* (2006.01)
*B60W 30/00* (2006.01)
(Continued)

(52) U.S. Cl.
CPC .............. *G01C 21/34* (2013.01); *B60W 30/00* (2013.01); *G01C 21/3407* (2013.01);
(Continued)

(58) Field of Classification Search
CPC ........................... G01C 21/34; G01C 21/3407; G01C 21/3602; B60W 30/00; B60W 2552/53;
(Continued)

(56) References Cited

U.S. PATENT DOCUMENTS 10,866,103 B2 12/2020 Agarwal et al.
2014/0009307 A1* 1/2014 Bowers .................. G08G 1/166
340/901

(Continued)

FOREIGN PATENT DOCUMENTS

CN 104271419 1/2015
CN 105280005 1/2016
(Continued)

OTHER PUBLICATIONS

First Office Action regarding Chinese Application No. 202210462702. 6, dated Nov. 29, 2023.

(Continued)

*Primary Examiner* — Basil T. Jos
(74) *Attorney, Agent, or Firm* — Harness, Dickey & Pierce, P.L.C.

(57) ABSTRACT

A system for gathering perception-data includes a transceiver and a controller-circuit. The transceiver is for installation on a host-vehicle. The transceiver is configured to receive perception-data from a perception-sensor installed on an assisting-vehicle proximate to the host-vehicle. The controller-circuit is in communication with the transceiver. The controller-circuit is configured to determine a preferred-perspective for gathering perception-data by the perception-sensor of the assisting-vehicle, and operate the transceiver to transmit a path-request to the assisting-vehicle that changes a planned-path of the assisting-vehicle to move the perception-sensor of the assisting-vehicle to the preferred-perspective.

20 Claims, 3 Drawing Sheets

Related U.S. Application Data

(60) Provisional application No. 62/629,203, filed on Feb. 12, 2018.

(51) Int. Cl.
  *G01C 21/36* (2006.01)
  *G08G 1/0968* (2006.01)
  *G08G 1/16* (2006.01)
  *G05D 1/00* (2006.01)

(52) U.S. Cl.
  CPC ... *G01C 21/3602* (2013.01); *G08G 1/096861* (2013.01); *G08G 1/161* (2013.01); *G08G 1/162* (2013.01); *G08G 1/167* (2013.01); *G05D 1/0088* (2013.01)

(58) Field of Classification Search
  CPC ......... B60W 2556/50; B60W 2556/65; B60W 60/001; G08G 1/096861; G08G 1/161; G08G 1/162; G08G 1/167; G08G 1/166; G05D 1/0088; G08C 17/02; H04B 1/40; H04W 4/029; H04W 4/40
  See application file for complete search history.

(56) References Cited

U.S. PATENT DOCUMENTS

| | | |
|---|---|---|
| 2017/0243485 A1 | 8/2017 | Rubin et al. |
| 2017/0369055 A1 | 12/2017 | Saigusa et al. |
| 2019/0249999 A1 | 8/2019 | Agarwal et al. |

FOREIGN PATENT DOCUMENTS

| | | |
|---|---|---|
| CN | 107539313 | 1/2018 |
| CN | 110164182 A | 8/2019 |
| KR | 20180013076 | 2/2018 |

OTHER PUBLICATIONS

"Foreign Office Action", CN Application No. 201910106886.0, May 24, 2021, 21 pages.
"Foreign Office Action", EP Application No. 19155815.4, Jun. 20, 2022, 5 pages.
"European Search Report", EP Application No. 19155815.4, Jun. 21, 2019, 2 pages.
"Non-Final Office Action", U.S. Appl. No. 15/897,566, filed Feb. 21, 2020, 8 pages.
"Notice of Allowance", U.S. Appl. No. 15/897,566, filed Aug. 24, 2020, 8 Pages.
"Foreign Office Action", CN Application No. 201910106886.0, Oct. 20, 2021, 7 pages.

\* cited by examiner

VEHICLE PERCEPTION-DATA GATHERING SYSTEM AND METHOD

CROSS-REFERENCE TO RELATED APPLICATIONS

This application is a continuation application of U.S. application Ser. No. 15/897,566, filed Feb. 15, 2018, which in turn claims priority to U.S. Provisional Application Ser. No. 62/629,203, filed Feb. 12, 2018, the disclosures of which are incorporated herein by reference.

TECHNICAL FIELD OF INVENTION

This disclosure generally relates to a system for gathering vehicle perception-data, and more particularly relates to a system that transmits a path-request from a host-vehicle to an assisting-vehicle that changes a planned-path of the assisting-vehicle to move a perception-sensor of the assisting-vehicle to the preferred-perspective for collecting perception for use by the host-vehicle.

BACKGROUND OF INVENTION

Situations occur where a field-of-view of sensors on an automated vehicle are obstructed by some object, so the automated vehicle is unable to gather perception-data regarding objects in that field-of-view.

BRIEF DESCRIPTION OF DRAWINGS

The present invention will now be described, by way of example with reference to the accompanying drawings, in which.

DETAILED DESCRIPTION

Figure 1:
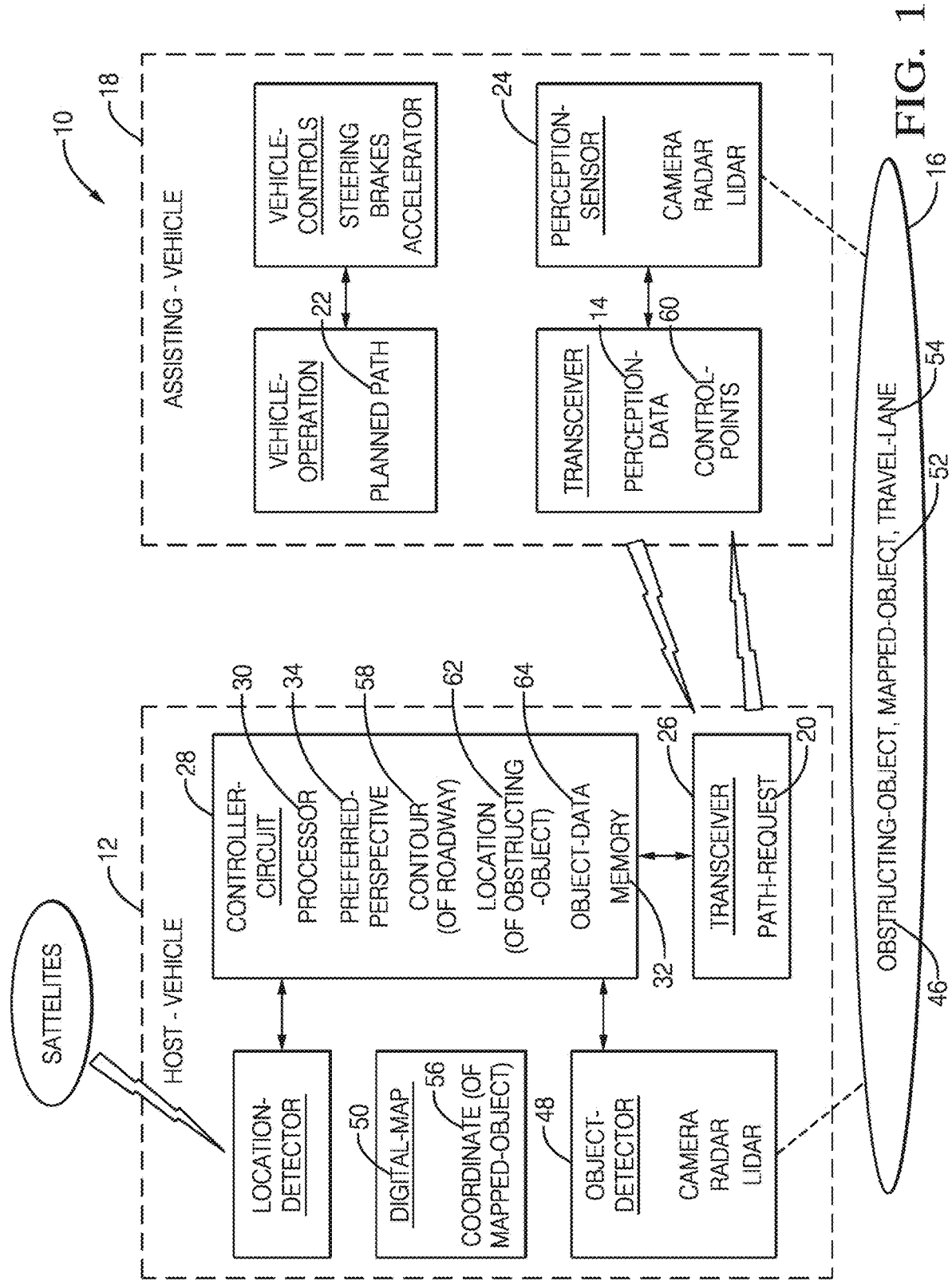
FIG. 1 is a diagram of a system for gathering vehicle perception-data in accordance with one embodiment.

FIG. 1 illustrates a non-limiting example of a system 10 for gathering vehicle related perception-data 14 used to operate a host-vehicle 12. As used herein, perception-data may be any type of information useful to operate (e.g. steer, brake, accelerate) the host-vehicle 12 while, for example, traveling a roadway 16. By way of example and not limitation, perception-data 14 may include locations (e.g. relative-position with respect to a sensor or detector, or absolute-location, i.e. GPS coordinates) of lane-markers, signs, traffic-signals, other-vehicles, buildings, etc. Perception-data 14 may come from a variety of sources such as sensors on board the host-vehicle 12 (e.g. image or video from a camera, radar-map from a radar, point-cloud from a lidar, or any combination thereof), or sensors that are part of infrastructure (e.g. a traffic-camera located at an intersection), or sensors/detectors located on other vehicles. As will described in more detail below, a point of novelty for the system 10 described herein is that the host-vehicle 12 receives perception-data 14 collected by an assisting-vehicle 18, and that the host-vehicle 12 sends a path-request 20 to the assisting-vehicle 18 to alter a planned-path 22 of assisting-vehicle 18 so that perception-data 14 collected by the assisting-vehicle 18 is from a different (better) perspective-view of an area or object on or near the roadway 16. That is, the path-request 20 asks the assisting-vehicle 18 to take some action (e.g. accelerate, slow-down, change lanes) so perception-data 14 collected by perception-sensors 24 on the assisting-vehicle 18 is collected from a better or improved perspective, i.e. in accordance with perception-data desired by the host-vehicle 12.

The host-vehicle 12 may be characterized as an automated vehicle. As used herein, the term automated vehicle may apply to instances when the host-vehicle 12 is being operated in an automated-mode, i.e. a fully autonomous mode, where a human-operator (not shown) of the host-vehicle 12 may do little more than designate a destination to operate a fully-autonomous instance of the host-vehicle 12. However, full automation is not a requirement. It is contemplated that the teachings presented herein are useful when the host-vehicle 12 is operated in a manual-mode where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object such as another-vehicle, a pedestrian, or a road sign.

The system 10 includes a transceiver 26 for installation, or to be installed, or already installed, on the host-vehicle 12. The transceiver 26 may communicate using any of many known protocols such as, but not limited to, dedicated-short-range-communications (DSRC), Wi-Fi, cellular phone networks, etc. The transceiver 26 is generally configured to receive perception-data 14 from the perception-sensor 24 (camera, radar, lidar, ultrasonic transducer, any combination thereof) installed on the assisting-vehicle 18 proximate to (e.g. within 200 meters of) the host-vehicle 12. While it is contemplated that it would be preferable for the assisting-vehicle 18 to be fully-automated, it is recognized that the assisting-vehicle 18 could be operated by a human-operator (not shown) who would respond appropriately to the path-request 20.

The system 10 includes a controller-circuit 28 in communication with the transceiver 26. The communication may be via a wired connection, wireless communications, or other known means that will be instantly recognized by those in the art. The controller 28 may include a processor 30 such as a microprocessor or other control circuitry such as analog and/or digital control circuitry including an application specific integrated circuit (ASIC) for processing data as should be evident to those in the art. Hereafter, any reference to the controller 28 being configured for something is to also be interpreted as suggesting that the processor 30 may also be configured for the same thing. The controller 28 may include memory 32 i.e. non-transitory computer-readable storage-medium, including non-volatile memory, such as electrically erasable programmable read-only memory (EEPROM) for storing one or more routines, thresholds, and captured data. The memory 32 may be part of the processor 30, or part of the controller 28, or separate from the controller 28 such as remote memory stored in the cloud. The one or more routines may be executed by the controller 28 or the processor 30 to perform steps for operating the host-vehicle 12 based on signals received by the controller 28 as described herein.

The controller-circuit 28 (or the processor 30) is generally configured to determine a preferred-perspective 34 (see also FIG. 2) for gathering perception-data 14 by the perception-sensor 24 of the assisting-vehicle 18. As used herein, the preferred-perspective 34 may be characterized as a location from which perception-data could be collected that provides the host-vehicle 12 with better information about objects on or near the roadway 16. For example, the preferred-perspective 34 may be selected so a portion of the roadway 16 obstructed from being viewed from the host-vehicle 12 can be viewed from the assisting-vehicle 18.

Figure 2:
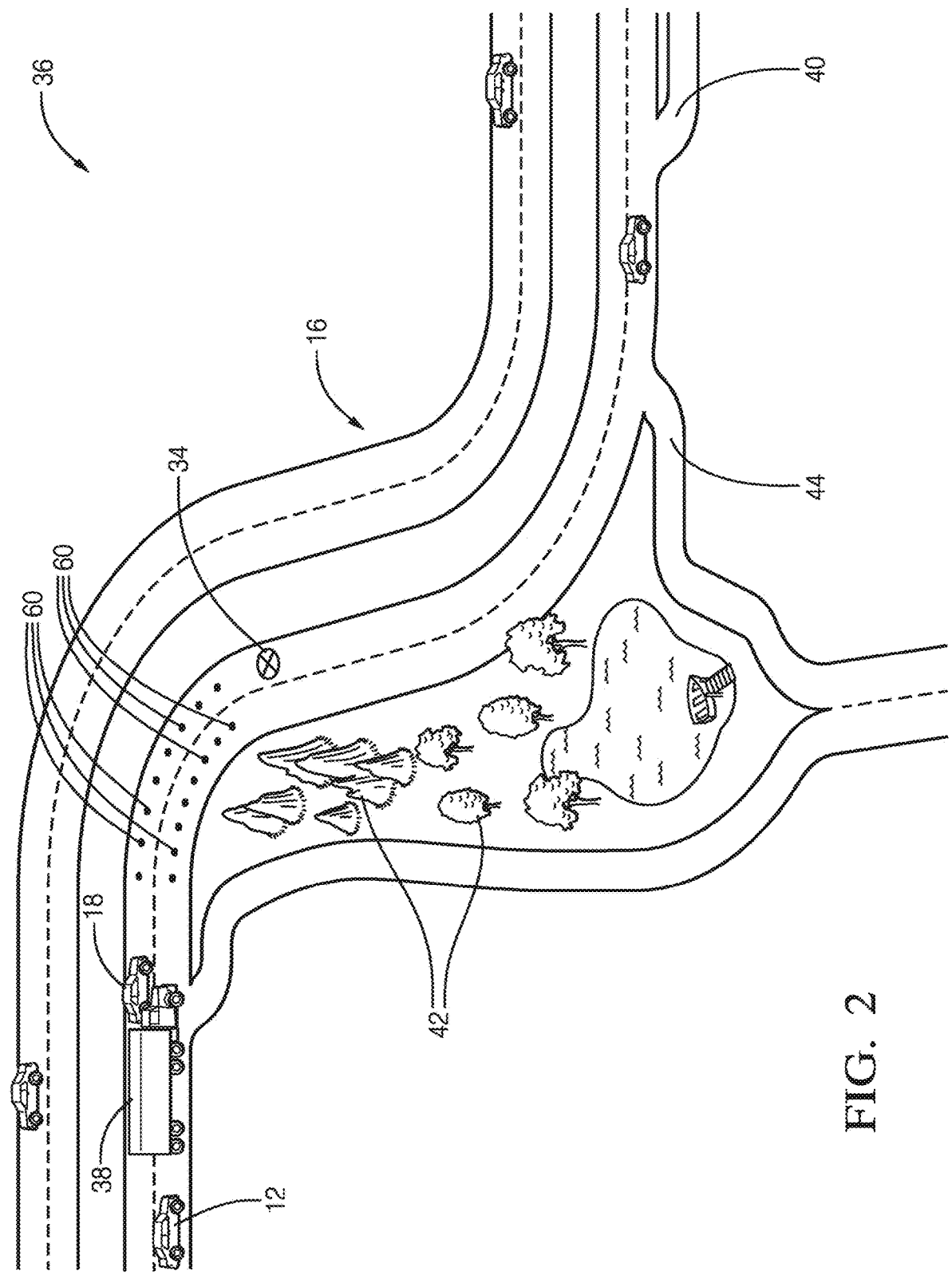
FIG. 2 is a scenario encountered by the system of FIG. 1 in accordance with one embodiment.

FIG. 2 illustrates a non-limiting example of a scenario 36 that the host-vehicle 12 may encounter while traveling the roadway 16. In this example, the host-vehicle 12 is following a truck 38 in the right-hand lane, and the assisting-vehicle 18 is traveling in the left-hand lane a short distance ahead of the host-vehicle 12. The host-vehicle 12 may intend to exit the roadway 16 at an upcoming instance of an exit-ramp 40, but the truck 38 is traveling slower than a desired-speed of the host-vehicle 12. However, because the field-of-view of an object-detector 48 (FIG. 1) on the host-vehicle 12 is blocked by the truck 38, the host-vehicle 12 is unable to, by itself (i.e. using only on-board sensors of the object-detector 48), determine if the truck 38 can be passed successfully before reaching the exit-ramp 40. Even though the assisting-vehicle 18 has a clear forward field-of-view for the perception-sensor 24 of the assisting-vehicle 18, the perception-sensor 24 is unable to see around the curves of the roadway 16 because of the presence of land-features 42 blocking the view of the exit-ramp 40.

The controller 28 determines the preferred-perspective 34 for viewing the roadway 16 to the exit-ramp 40 to determine if there are already numerous vehicles in the right-hand lane ahead of the truck and/or numerous vehicles entering the roadway 16 from an entrance-ramp 44. E.g., if the right-hand lane approaching the exit-ramp 40 has numerous vehicles present that would make it difficult for the host-vehicle 12 to enter the right-hand lane after passing the truck 38, then the host-vehicle 12 may decide to stay behind the truck 38.

Having determined the preferred-perspective 34, the controller 28 then operates the transceiver 26 to transmit the path-request 20 to the assisting-vehicle 18 that changes the planned-path 22 of the assisting-vehicle 18 to move (e.g. steer and/or accelerate/decelerate) the perception-sensor 24 of the assisting-vehicle 18 to the preferred-perspective 34. The controller 28 may estimate the planned-path 22 of the assisting-vehicle 18 based on observation of the assisting-vehicle 18, e.g. based on extrapolation from a present-trajectory, or based on forecasted-trajectory broadcast from the assisting-vehicle 18. The path-request 20 may include, but is not limited to, a lane-change, a speed-change, a position-change within a present lane, or maintain a relative orientation between the host-vehicle 12 the assisting-vehicle 18 until an obstructing-vehicle (not shown) obstructing a lane change is out of the way. In this instance, for the scenario 36, the path-request 20 may ask the assisting-vehicle 18 to accelerate to reach the preferred-perspective as quickly as possible so the host-vehicle 12 has as much time as possible to pass the truck 38.

The system 10 may include an object-detector 48 for installation, or to be installed, or already installed, on the host-vehicle 12. The object-detector 48 could be same or different configuration as perception-sensor 24 on assisting-vehicle 18. The use of the terms object-detector and perception-sensor herein is only to help the reader to distinguish sensors associated with the assisting-vehicle 18 from sensors associated with the host-vehicle 12, and not to suggest that there is necessarily a difference of configuration between the perception-sensor 24 and the object-detector 48. The controller-circuit 28 may be is configured to determine the preferred-perspective 34 in accordance with a location 62 of an obstructing-object 46 (FIG. 1), e.g. the truck 38, the land-features 42, other-vehicles (not shown), and/or pedestrians/bicyclists (not shown), detected by the object-detector 48. For example, the obstructing-object 46 may prevent the object-detector 48 on host-vehicle 12 from determining a lane-shape of the roadway 16, so the path-planning used for automated operation of the host-vehicle 12 may be operating with low confidence.

The system 10 may include a digital-map 50 that indicates the presence of a mapped-object 52 that may not be detected by the object-detector 48 the host-vehicle 12, or any off-board other-detectors in communication with the controller 28. The digital-map 50 may be stored on-board (i.e. in memory 32), or in the cloud, or both. Examples of the mapped-object 52 include, but are not limited to: a travel-lane, a reference-object (e.g. a post with well-known GPS coordinates), a building (not shown), a safe-stop zone, and/or a traffic-signal (not shown). The controller-circuit 28 may be configured to determine the preferred-perspective 34 in accordance with a coordinate 56 of the mapped-object 52 identified in the digital-map 50. For example, the obstructing-object 46 may prevent the object-detector 48 on host-vehicle 12 from determining if the mapped-object 52, which in this example is a safe-stop zone ahead, is available for use, so the path-planning used for automated operation of the host-vehicle 12 may be operating with low confidence.

In another embodiment, the controller-circuit 28 may be configured to determine a contour 58 of the roadway 16 traveled by the host-vehicle 12. As used herein, the contour 58 may characterize, for example, a lateral or horizontal (e.g. left/right) curvature of the roadway 16, a vertical curvature (e.g. instance of the roadway 16 cresting a hilltop) or any other shape of the roadway 16 that may prevent the object-detector 48 from being able to determine the shape of the roadway 16 to a desired distance away from the object-detector 48. The contour 58 may be indicated by object-detector 48 (at least partially), the digital-map 50, the perception-data 14 from assisting-vehicle 18, or any combination thereof. The controller 28 may then be configured to determine the preferred-perspective 34 for the perception-sensor 24 of the assisting-vehicle 18 in accordance with the contour 58. For example, as shown in FIG. 2, the curvature of the roadway 16 prevents direct observation of the exit-ramp from the position of the host-vehicle 12, so the path-request 20 asks the assisting-vehicle 18 to move to the preferred-perspective 34.

In another embodiment, the perception-data 14 may include control-points 60 that are characteristic or descriptive of the travel-lane 54. The travel-lane 54 could be the present-lane traveled by the host-vehicle 12 or the assisting-vehicle 18, an adjacent-lane, or any other-lane proximate to the host-vehicle and viewable by the perception-sensor 24 of the assisting-vehicle 18. That is, the host-vehicle 12 requests that the assisting-vehicle 18 maneuver to a position where lane-center data from the assisting-vehicle 18 can be supplied to the host-vehicle 12 for the goal of the host-vehicle 12 accomplishing a lane-change or avoidance-maneuver. The control-points 60 that may be indicated relative to GPS coordinates or relative to the digital-map 50. This information is sent from the assisting-vehicle to the host-vehicle, optionally along with position of any instance of another vehicle in front of the assisting-vehicle 18. The host-vehicle 12 has requested this information and may ask the assisting-vehicle 18 to maneuver to a position to supply data the host-vehicle 12 is not able to perceive. Trajectories of the host-vehicle 12 are typically calculated by the host-vehicle 12. In computer-aided geometric design a control-point is a member of a set of points used to determine the shape of a spline curve or, more generally, a surface or higher-dimensional object.

Figure 3:
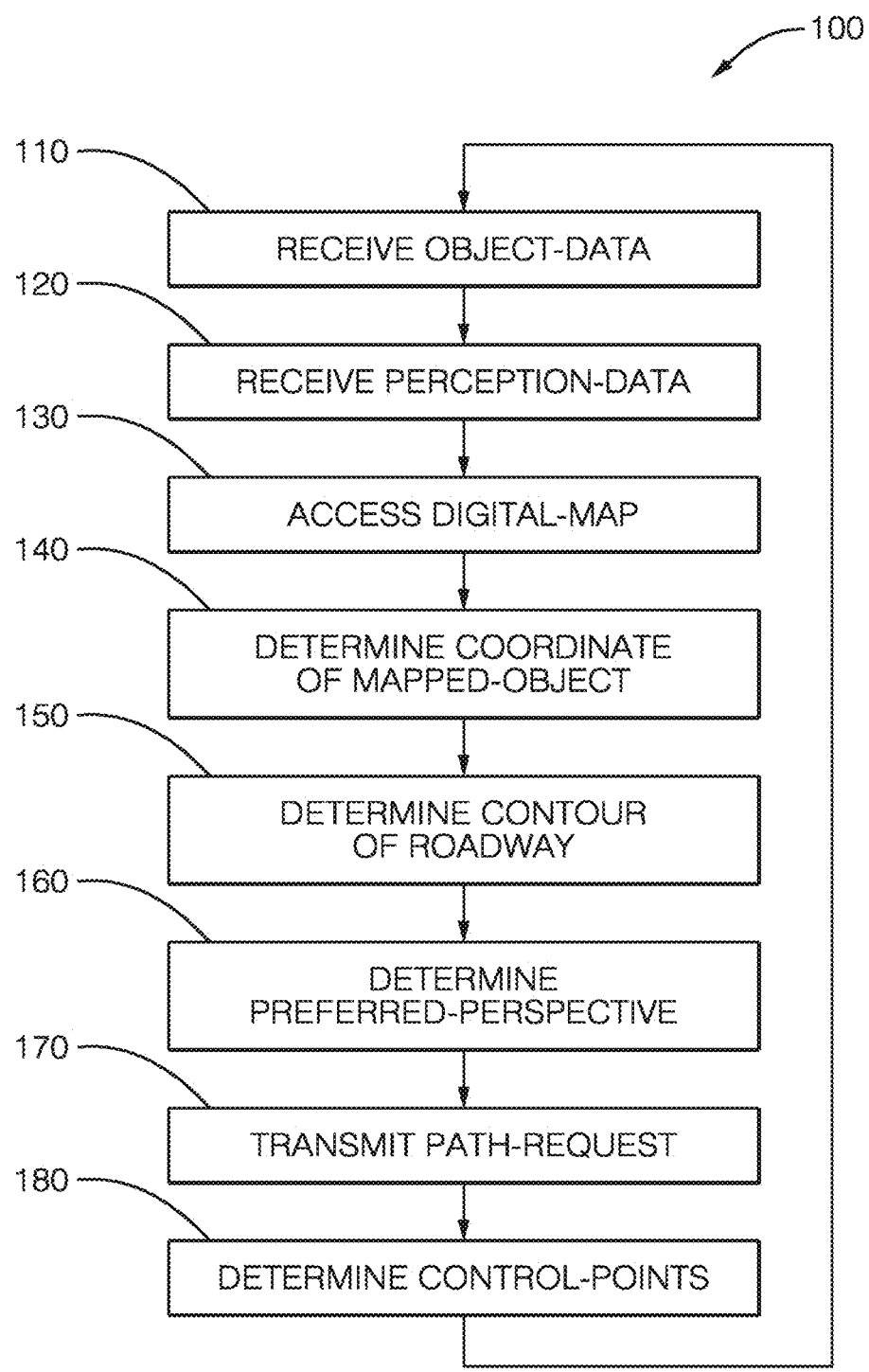
FIG. 3 is a method of operating the system of FIG. 1 in accordance with one embodiment.

FIG. 3 illustrates a non-limiting example of a method 100 of operating the system 10 for gathering the perception-data 14.

Step 110, RECEIVE OBJECT-DATA, may include receiving object-data 64 from the object-detector 48 mounted on the host-vehicle 12 if the host-vehicle 12 is so equipped. It is contemplated that if the object-detector 48 completely or partially fails, the perception-data 14 from the assisting-vehicle 18 may be the only way for the host-vehicle 12 to gather sufficient information to continue operate autonomously, possibly in some reduced capacity or limited manner.

Step 120, RECEIVE PERCEPTION-DATA, may include receiving, by a transceiver 26 of the host-vehicle 12, perception-data 14 from a perception-sensor 24 installed on an assisting-vehicle 18 proximate to the host-vehicle 12. While step 120 is shown as being early in the method 100, this is not a requirement as it is recognized that this step could be moved or duplicated at several places in the method 100.

Step 130, ACCESS DIGITAL-MAP, may include accessing the digital-map 50 that indicates the coordinate 56 of a mapped-object 52. If the mapped-object 52 is also indicated in the perception-data 14, then that information can be used to operate the host-vehicle 12.

Step 140, DETERMINE COORDINATE OF MAPPED-OBJECT, may include the controller 28 trying to match an object detected by the perception-sensor 24 and indicated in the perception-data 14 to an instance of the mapped-object 52 indicated in the digital-map 50. For example, an image from the camera of the perception-sensor 24 may be analyzed and it may be determined that an object in the image corresponds to a typical example of a reference-marker (standardized object provided for localization of automated vehicles). The digital-map 50 may then be accessed to determine if there is an instance of a reference-marker documented (e.g. the coordinate 56 is specified) in the digital-map 50 at or near the location of the object detected.

Step 150, DETERMINE CONTOUR OF ROADWAY, may include determining a contour 58 of a roadway 16 traveled by the host-vehicle 12. The contour 58 may be determine based on information from many sources including, but not limited to, the object-detector 48 of the host-vehicle 12, the perception-sensor 24 of the assisting-vehicle 18 (even if the assisting-vehicle 18 is not positioned at the preferred-perspective 34), and/or the digital-map 50.

Step 160, DETERMINE PREFERRED-PERSPECTIVE, may include determining, by the controller-circuit 28 (or the processor 30), which is in communication with the transceiver 26, a preferred-perspective 34 for gathering perception-data 14 by the perception-sensor 24 of the assisting-vehicle 18. The determination of the preferred-perspective 34 may be in accordance with (i.e. may take into consideration or may be based on), but not limited to, a location 62 of an obstructing-object 46 detected by the object-detector 48, the coordinate 56 of a mapped-object 52, the contour 58 of the roadway 16, or any combination thereof.

Step 170, TRANSMIT PATH-REQUEST, may include transmitting, by the transceiver 26, a path-request 20 to the assisting-vehicle 18 that changes a planned-path 22 of the assisting-vehicle 18 to move the perception-sensor 24 of the assisting-vehicle 18 to the preferred-perspective 34.

Step 180, DETERMINE CONTROL-POINTS, may include determining, by the assisting-vehicle 18, control-points 60 that are characteristic of, or descriptive of, a travel-lane 54 proximate to the host-vehicle 12.

Described herein is a first device 28 that includes one or more processors 30, a memory 32, and one or more programs 100 stored in memory, the one or more programs 100 including instructions for performing the method 100 of any one of claims 11-15.

Also, described herein is a non-transitory computer-readable storage-medium 32 comprising one or more programs 100 for execution by one or more processors 30 of a first device 28, the one or more programs including instructions which, when executed by the one or more processors 30, cause the first device to perform the method of any one of claims 11-15.

Accordingly, a system 10, a controller 28 for the system 10, and a method 100 of operating the system 10 are provided. The host-vehicle 12 transmits a request for the assisting-vehicle 18 to move to a position (the preferred-perspective 34) so that the assisting-vehicle 18 has a better view of an object or area that the object-detector 48 of the host-vehicle is unable to view, for any number of reasons.

While this invention has been described in terms of the preferred embodiments thereof, it is not intended to be so limited, but rather only to the extent set forth in the claims that follow.

What is claimed is:

1. A system comprising a controller circuit configured to:
    determine a preferred perspective location of a perception sensor of an assisting vehicle;
    transmit, from a host vehicle and to the assisting vehicle, a path request to move the assisting vehicle with the perception sensor to the preferred perspective location; and
    receive, by the host vehicle and from the assisting vehicle, perception data gathered by the perception sensor from the preferred perspective location.

2. The system of claim 1, wherein the controller circuit is configured to determine the preferred perspective location relative to a location of an object that obstructs an object detector of the host vehicle.

3. The system of claim 1, wherein the controller circuit is configured to determine the preferred perspective location relative to a coordinate of a mapped object identified in a digital map.

4. The system of claim 1, wherein the controller circuit is configured to determine the preferred perspective location in accordance with a contour of a roadway traveled by the host vehicle.

5. The system of claim 1, wherein the perception data comprises control points characteristic of a travel lane proximate to the host vehicle.

6. The system of claim 1, wherein the path request to move the perception sensor to the preferred perspective location configures the assisting vehicle to change a planned path of the assisting vehicle to move the perception sensor to the preferred perspective location.

7. The system of claim 6, wherein the path request to move the perception sensor to the preferred perspective location configures the assisting vehicle to steer, accelerate, or decelerate to change the planned path of the assisting vehicle to move the perception sensor to the preferred perspective location.

8. A method comprising:
    determining, by a controller circuit of a host vehicle, a preferred perspective location of a perception sensor of an assisting vehicle;

transmitting, by the controller circuit and to the assisting vehicle, a path request to move the perception sensor to the preferred perspective location; and receiving, by the controller circuit and from the assisting vehicle, perception data gathered by the perception sensor from the preferred perspective location.

9. The method of claim 8, further comprising:
determining the preferred perspective location relative to a location of an object that obstructs an object detector of the host vehicle.

10. The method of claim 8, further comprising:
determining the preferred perspective location relative to a coordinate of a mapped object identified in a digital map.

11. The method of claim 8, further comprising:
determining the preferred perspective location in accordance with a contour of a roadway traveled by the host vehicle.

12. The method of claim 8, wherein the perception data comprises control points characteristic of a travel lane proximate to the host vehicle.

13. The method of claim 8, wherein transmitting the path request to move the perception sensor to the preferred perspective location comprises:
transmitting the path request to change a planned path of the assisting vehicle to move the perception sensor to the preferred perspective location.

14. The method of claim 8, wherein transmitting the path request to move the perception sensor to the preferred perspective location comprises:
transmitting the path request to cause the assisting vehicle to steer, accelerate, or decelerate to move the perception sensor to the preferred perspective location.

15. A system for a host vehicle, the system comprising:
means for determining a preferred perspective location of a perception sensor of an assisting vehicle;
means for transmitting, to the assisting vehicle, a path request to move the perception sensor to the preferred perspective location; and
means for receiving, from the assisting vehicle, perception data gathered by the perception sensor from the preferred perspective location.

16. The system of claim 15, further comprising:
means for determining the preferred perspective relative to a location of an object that obstructs an object detector of the host vehicle.

17. The system of claim 15, further comprising:
means for determining the preferred perspective location relative to a coordinate of a mapped object identified in a digital map.

18. The system of claim 15, further comprising:
means for determining the preferred perspective location in accordance with a contour of a roadway traveled by the host vehicle.

19. The system of claim 15, wherein the perception data comprises control points characteristic of a travel lane proximate to the host vehicle.

20. The system of claim 15, wherein the means for transmitting the path request to move the perception sensor to the preferred perspective location comprise:
means for transmitting the path request to change a planned path of the assisting vehicle to move the perception sensor to the preferred perspective location.

* * * * *